Dec. 20, 1938.  H. P. SORENSEN  2,141,071

NUT LOCK

Filed March 24, 1936

HENRY PEIRCE SORENSEN INVENTOR.

BY J. Windsor Davis

ATTORNEY.

Patented Dec. 20, 1938

2,141,071

UNITED STATES PATENT OFFICE 2,141,071

NUT LOCK

Henry Peirce Sorensen, Detroit, Mich.

Application March 24, 1936, Serial No. 70,558

3 Claims. (Cl. 151—33)

This invention relates to nut locks and has as one of its principal objects to provide a means for locking a nut onto a bolt in such a way that it cannot easily be tampered with.

Another object of this invention is to provide a means for locking a fastening member in such a way that it cannot be removed with the tools that thieves ordinarily carry but which can readily be removed by a properly equipped mechanic.

More specifically, it is an object of this invention to provide economical means for fastening automobile accessories, such as radios and heaters, in place on the dash of a vehicle in such a way that they cannot be readily removed by unauthorized persons.

Figure 1:
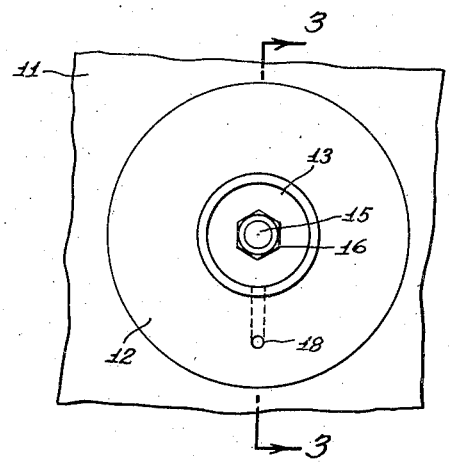
Figure 1 is a front elevation of one of the preferred embodiments of the invention, showing the device partly installed.
Figure 2:
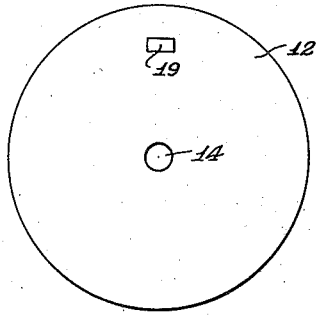
Figure 2 is a rear elevation of the device before installation.
Figure 3:
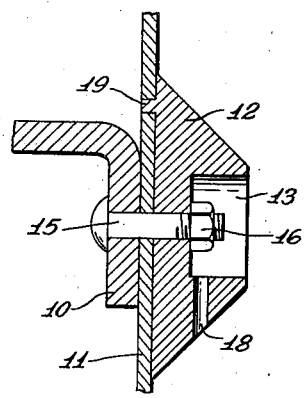
Figure 3 is a section on the line 3—3 of Figure 1 taken in the direction of the arrows.
Figure 4:
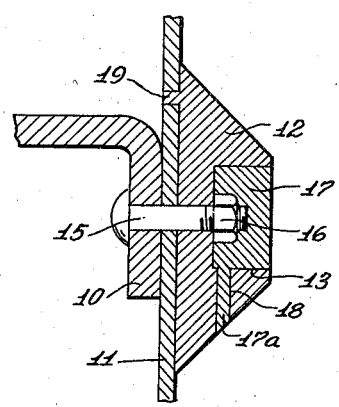
Figure 4 is a section similar to Figure 3 but showing the device completely installed.

The embodiment of the invention shown in the drawing is illustrated in connection with securing a member 10, which may be the frame of a radio, for example, to a second member 11, which may be the dash of a motor vehicle. The embodiment illustrated comprises a frusto-conical body 12 whose larger side is adapted to fit against the face of the dash or other member 11. The smaller side of the body 12 contains a large counter-bore or recess 13 from the bottom of which a smaller hole 14 extends on through to the other side. A bolt 15 passes through aligned holes in the two members 10 and 11 and through the hole 14 in the body 12 and is secured by a nut 16 lying at the bottom of the counterbore 13.

The space in the counterbore 13 around the nut 16 and the end of the bolt 15 is filled with a metal or alloy 17 having a low melting point, which locks the nut in position and prevents access to it. Plumbers' solder, such as is used for wiping joints in lead pipe, is especially suitable because, as it solidifies, it forms a pasty mass which can be held and pushed into place in the recess 13 with a felt or other pad held in the hand. The solder or other easily fusible metal, besides adhering to the walls of the recess, is keyed in place by a portion 17a extending into a hole 18 which leads from near the bottom of the counterbore 13 to the exterior of the body 12.

Besides serving as an additional means for anchoring the solder, the hole 18 serves as a drain when it is desired to melt and remove the solder 17 to allow the nut 16 to be reached and removed. When the nut-lock is used on a horizontal or sloping and upwardly facing surface, such as the upper portion of the dash of many motor vehicles, it might be difficult to remove the solder 17 from the recess 13 containing it if the drain hole 18 were absent. With the drain hole 18 present, it is only necessary to heat the nut lock to a temperature at which the solder 17 is liquid, using a torch or other heating means, and the molten solder 17 runs out, even when the device is used on an upwardly facing surface.

The drain hole 18 causes no material inconvenience when filling the recess 13 around the nut 16 with fusible metal, especially if plumbers' solder is used, because its outer end is easily blocked with a piece of felt or other material held over it or by a piece of clay or putty forced into it.

Proper orientation of the body 12 so that the drain hole 18 leads downward from the recess 13 is ensured by a lug or key 19 projecting from the back of the body 12 into a suitably placed hole 20 in the dash 11. The lug 19 also prevents the nut lock from being turned around on the bolt 15 in order to unscrew the nut 16 without removing the solder 17.

When the nut lock is in place, and filled with solder, it cannot be removed except by the prolonged application of enough heat to melt the solder, a process which cannot be carried out quickly and unobtrusively. Because the sides of the body 12 are sloping, it is impossible to grip it with a pipe wrench or similar tool and apply enough force to shear off the lug 19 or break the bolt.

From the above description, it will be seen that I have provided a theft-proof nut lock which is easily applied and readily removed with the proper tools, and which at the same time is simple and inexpensive.

Various changes in construction may be made without departing from the spirit of my invention, and I therefore desire to be extended protection within the scope of the appended claims, wherein:

What I claim is:

1. In combination, a bolt having a nut, a nut lock for said nut comprising a hard metal envelope having an anchorage means for cooperation with an adjacent surface, a soft metal covering for said nut residing within the contour of said envelope, and drainage means for the release of said soft metal from said envelope under heating, said drainage means constituting means for restraining said soft metal against movement relative to said envelope.

2. In combination, a bolt having a nut, a nut lock for said nut comprising a hard metal envelope having an anchorage means for cooperation with an adjacent surface, a soft metal covering for said nut residing within the contour of said envelope, and drainage means for the release of said soft metal from said envelope under heating, said drainage means constituting means for restraining said soft metal against movement relative to said envelope, said envelope having a circular formation in any cross section parallel to said adjacent surface and having diverging sidewalls.

3. In combination, a bolt having a nut, a nut lock for said nut comprising a hard metal envelope having anchorage means for cooperation with an adjacent surface and a soft metal covering for said nut residing within the contour of said envelope, said envelope having a frustoconical shape and a recess in the smaller base thereof for residence of said nut and said soft metal, said envelope having a passageway from said recess to the sidewalls thereof, said passageway being normally filled with said soft metal and constituting both an anchorage means for said soft metal and a drainage means for said soft metal upon melting thereof.

HENRY PEIRCE SORENSEN.